United States Patent [19]

Caprino

[11] 4,322,320

[45] Mar. 30, 1982

[54] PROCESS FOR FORMULATING SILICONE RUBBER PRODUCTS

[75] Inventor: Joseph C. Caprino, Schenectady, N.Y.

[73] Assignee: General Electric Company, Waterford, N.Y.

[21] Appl. No.: 144,123

[22] Filed: Apr. 28, 1980

[51] Int. Cl.$^3$ .............................................. C08L 1/00
[52] U.S. Cl. ..................... 523/212; 528/15; 528/24; 528/31; 528/32; 528/42; 528/43; 525/474; 525/477; 525/478; 524/16; 524/34; 524/413; 524/431; 524/432; 524/433; 524/407; 524/430; 524/445; 524/448; 524/452; 524/703; 524/733; 524/783; 524/789; 524/790; 524/862

[58] Field of Search ...................... 528/15, 24, 31, 32, 528/42, 43; 260/37 SB, 9; 525/474, 477, 478

[56] References Cited

U.S. PATENT DOCUMENTS 4,061,609 12/1977 Bobear .................................. 528/15

Primary Examiner—Melvyn I. Marquis
Attorney, Agent, or Firm—Michael J. Doyle; John L. Young; Philip L. Schlamp

[57] ABSTRACT

Process for preparing platinum catalyzed SiH-olefin silicone compositions using hydroperoxy-containing inhibitors.

16 Claims, No Drawings

PROCESS FOR FORMULATING SILICONE RUBBER PRODUCTS

BACKGROUND OF THE INVENTION

The present invention relates to platinum catalyzed SiH-olefin silicone compositions utilizing an addition cure reaction and more specifically it relates to an improved process for formulating such silicone rubber products. The present invention allows a silicone formulator or fabricator to selectively control the rheological properties of the silicone products and process. Additionally, the present invention provides a silicone rubber product which utilizes an effective level of inhibitor which is lower than that which was previously available in the art.

In U.S. Pat. No. 4,061,609, issued Dec. 6, 1977, Bobear demonstrated a silicone rubber composition which has been shown to be useful, commercially successful, and which has met with wide acceptance in the silicone industry. This patent is hereby incorporated by reference.

Bobear recognized that several major disadvantages of prior art silicone rubber compositions could be eliminated entirely with the use of a proper inhibitor for the platinum catalyzed cure reaction. SiH-olefin platinum catalyzed compositions had been well-known in the art. Such compositions generally comprise a vinyl-containing polysiloxane base material having a treated or untreated filler therein and a hydrogen-containing polysiloxane along with a platinum catalyst which could be solid platinum metal deposited on a solid carrier such as gamma alumina or it could be a solubilized platinum complex. Normal procedure was to package the vinyl polysiloxane, the filler and the platinum catalyst in one package and to provide a second package containing the hydrogen-containing polysiloxane. The fabricator or other user of the material produced a cured silicone elastomer by mixing the two packages according to specified proportions whereupon the composition could be fabricated to a desired shape and allowed to cure either at room temperature over a period of time or at elevated temperatures in relatively very short periods of time.

The above-described compositions which were sold in the two component or package format are usually referred to as room temperature vulcanizable silicone rubber compositions and more specifically, SiH-olefin platinum catalyzed room temperature vulcanizable silicone rubber compositions. It is to be understood that these types of compositions could be cured at varying rates depending upon the temperature. For example, at room temperature the composition might take 1 hour to 12 hours to cure but at elevated temperatures such as 100° to 200° C. the composition might cure in seconds or minutes.

Such compositions start curing as soon as the two components are mixed together and will usually cure or at least set in approximately 1 hour even at room temperature. Therefore, it was desirable to incorporate into the prior art compositions inhibitors which would retard the curing of the composition for at least 12 hours when the two components were mixed together in order to allow the composition to be fabricated to the desired shape before such composition sets. After the two components have been mixed together but prior to their having set such that they cannot be molded further, it is desirable to have as long a work-life as possible. The function of the inhibitor is to increase the work-life of the composition prior to curing at an elevated temperature. The inhibitor must provide suitable work-life yet not impede or any way detract from the final cure and properties of the composition of the silicone elastomer.

Among the prominent prior art inhibitors were acetylenic-functional organic polymers and monomers as shown by Kookootsedes in U.S. Pat. No. 3,445,420.

These inhibitors were ultimately undesirable insofar as the acetylenic radical-containing compounds had to be sealed in air tight containers because exposure or leaks to the atmosphere will cause the acetylenic compound to evaporate thereby decreasing its inhibiting properties. This was a further disadvantage insofar as ordinarily SiH-olefin platinum catalyzed compositions did not otherwise have to be packaged in air tight containers.

Accordingly, Bobear recognized a very effective class of inhibitors utilizing hydroperoxy radicals which were quite effective and overcame many of the prior art disadvantages. As mentioned above, Bobear's rubber composition met with success in the market place and served to provide useful silicone rubber fabricated silicone rubber products. Not only did Bobear avoid the use of explosive acetylenic compounds which require careful manufacturing procedures for their preparation and use but he was able to provide inhibitors having a higher effective rate of inhibition.

Prior SiH-olefin platinum catalyzed compositions usually consisted of polysiloxane polymers having a viscosity of approximately 1000 to 500,000 centipoise at 25° C. so that such polymers could be manipulated or worked at a rate which is more efficient than possible with higher viscosity polymers. In other words, the lower viscosity polymers serve the additional purpose of assisting in providing additional work-life.

Since Bobear utilized extremely effective inhibitors he was able to provide high viscosity SiH-olefin platinum catalyzed compositions wherein viscosity could range anywhere from one million to 200 million centipoise at 25° C. Not only did these compositions remain workable, the final products exhibited very satisfactory higher tensile strengths. These compositions opened up entirely new markets and uses for these SiH-olefin platinum catalyzed silicone rubber compositions.

The difficulty in developing such high viscosity SiH-olefin platinum catalyzed compositions arose because they normally had to be worked on a mill or other apparatus after the two ingredients were mixed together thereby requiring extended work-life of at least 12 hours. In the past when such high viscosity materials were used, portions of the material would cure right on the mill upon contact and mixing of the two components. This made it exceedingly difficult to fabricate products. Bobear provided compositions which avoided many of these problems.

Fabricators and formulators in the silicone industry immediately recognized the significance of Bobear's contribution. It has become an industry standard to utilize Bobear's rubber composition in a two-package format at a 1:1 or 50:50 mixture ratio. This system works quite well as evidenced by the success in the market but there are several disadvantages which have now been overcome by the present invention.

The present invention provides a system for packaging and formulating silicone rubber products which lowers the cost to the formulator, especially inventory costs since large quantities of two different packages are no longer required. The process of the present invention also allows more reproducible results and products since formulators have previously been well accustomed to utilizing an approximately 99:1 system.

Furthermore, the present invention offers flexibility to the fabricator who may now vary the cure rate of the system thereby facilitating various types of fabrication such as extrusion through a hot air tunnel or a steam autoclave as well as molding via compression, tranfer or injection devices.

The flexibility afforded by the opportunity of varying the cure rates, as provided by the present invention can be demonstrated by considering various silicone rubber fabricating techniques. When the catalyzed composition is manipulated through an extrusion device and directed to a hot air vulcanization tunnel or zone, it is desirable that there be a relatively quick cure of the material. That is to say, best results are obtained if the composition begins to cure immediately upon exposure to the HAV zone.

However, if a hot mold technique is utilized such as compression or injection molding, a slower cure is necessary in order that the rubber first obtain the configuration of the molding device before the cure reaction is initiated.

A two-package, 50:50 mixture effectively fixes the ratio of catalyst and inhibitor and thereby limits a fabricator flexibility. Not only does the three-package system of the present invention provide such flexibility through the selective use of cure agents and cure modifiers, it does so at effective inhibitor levels which are lower than those previously provided by the art.

It is therefore a primary object of the present invention to provide a system for formulating silicone rubber products.

It is another object to provide silicone rubber compositions utilizing lower effective levels of inhibitors.

It is another object to provide a system for modifying the cure rate and rheological properties of a silicone rubber composition during the fabrication of such composition.

These and other objects will become apparent to those skilled in the art upon careful consideration of the following specification, examples and claims.

SUMMARY OF THE INVENTION

The process of the present invention provides a system for formulating an addition cured silicone rubber composition wherein specific proportions of each of three component packages are mixed together and cured to form the silicone rubber compositions. Component A is a silicone base polymer which is comprised of 100 parts by weight of a vinyl-containing linear polysiloxane having the formula,

(I)

and blends of such polysiloxanes and where R is selected from the class consisting of alkyl radicals of 1 to 8 carbon atoms, vinyl radicals, phenyl radicals, fluoroalkyl radicals of 3 to 10 carbon atoms and mixtures thereof and where the vinyl radical unsaturation in said polymer is at least 0.005 mole percent, and a varies from 1.98 to 2.01.

Preferably the vinyl-containing base polysiloxane has the formula given by (II),

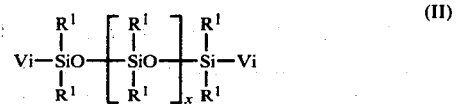
(II)

which has a viscosity that varies from 1,000 to 300,000,000 centipoise at 25° C., where Vi is vinyl and $R^1$ is selected from the class consisting of vinyl, phenyl, alkyl radicals of 1 to 8 carbon atoms, fluoroalkyl radicals of 3 to 10 carbon atoms and mixtures thereof and where x varies from 330 to 11,000. Note that the vinyl-containing polysiloxane can be present as a blend of such polysiloxanes wherein up to 50 percent by weight can be a second vinyl-containing polysiloxane of the formula,

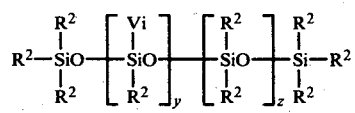

where Vi is vinyl and $R^2$ is selected from the class consisting of alkyl radicals of 1 to 8 carbon atoms, phenyl, fluoroalkyl radicals of 3 to 10 carbon atoms and mixtures thereof, y varies from 1 to 4,000 and z varies from 1 to 4,000 and which has a viscosity that varies from 1,000 to 1,000,000 centipoise at 25° C.

Preferably, the first polysiloxane will have a viscosity varying from 1,000,000 to 200,000,000 centipoise at 25° C. and the second polysiloxane has the viscosity which varies from 50,000 to 500,000 centipoise at 25° C. Also, preferably, the vinyl content of such vinyl-containing polysiloxane or blends will vary from 0.01 to 1.0 mole percent.

To the 100 parts of the vinyl-containing polymer in Component A will be added from 0.5 to 50.0 and preferably 0.5 to 3.0 parts by weight of hydrogen-containing polysiloxane. The hydrogen-containing compound can be a hydride resin composed of

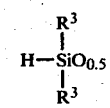

units said $SiO_2$ units where the ratio of $R^3$ to Si varies from 1.1 to 1.9 and $R^3$ is selected from the class consisting of alkyl radicals of 1 to 8 carbon atoms, phenyl radicals and fluoroalkyl radicals of 3 to 10 carbon atoms. Additionally, the resin may contain a number of $(R^3)_2$ SiO units such that the $R^3$ to Si ratio will vary from 1.5 to 2.1. A particular hydride compound could be a polysiloxane of the formula,

where $R^4$ is as $R^3$ but also includes hydrogen, v varies from 1 to 1,000 and w varies from 0 to 200 and the viscosity of the polymer varies from 1 to 10,000 centipoise at 25° C.

Component B is a curing agent comprised of approximately one hundred parts of the same vinyl-containing polysiloxanes described above but containing therein at least 0.40 parts of an inhibitor compound having at least 1 hydroperoxy radical of the formula —C—O—O—H. Particularly suitable inhibitors are tertiary butyl hydroperoxide, methyl ethyl ketone peroxide, cumene hydroperoxide, 1,1,3,3-tetramethylbutyl hydroperoxide, and 2,5-dimethyl-2,5-dihyroperoxy hexane.

Since the present invention provides an addition cured silicone rubber, platinum is used to catalyze the cure reaction. This platinum will preferably be contained in Component B of the system. As is wellknown in the art, at least approximately 0.1 parts platinum is necessary per one million parts vinyl polymer, as contained in Component A.

Therefore, in order to provide the necessary amount of catalyst, Component B will contain approximately at least 0.001 parts platinum based upon one hundred parts by weight of the vinyl polymer also contained in Component B. Thus, when approximately 99 parts of Component A is formulated with approximately 1 part of Component B, there will be present sufficient catalyst to cure the composition. Of course, when additional platinum is utilized or if additional amounts of Component B are utilized, the cure rate can be selectively adjusted.

Ordinarily, a formulator can mix from 95 to 99.5 parts by weight of Component A with approximately 0.5 to 5.0 parts Component B.

Component C is a cure modifying agent comprised of 100 parts of the same vinyl-contining polysiloxanes as described above but containing therein at least 0.10 parts of the hydroperoxy inhibitor compounds described above based upon the weight of vinyl polymer in Component C. Component C can be utilized by mixing approximately 0.5 to 5.0 parts Component C with the above-described Components A and B. It will be noted that between B and C as little as approximately 0.004 parts inhibitor per 100 parts vinyl polymer in Component A will effectively inhibit the composition and provide the advantages discussed in the Background of the Invention. This level of inhibitor is lower than that previously taught in the art.

The combination of Components A, B and C when mixed, can be cured by well-known means such as extrusion, molding or injection, to provide fabricated silicone rubber products. Of course it is possible for one skilled in the art to add various process aids and fillers to the composition to achieve desired effects.

It can also be seen that a skilled silicone rubber fabricator will now be able to control the rheological properties of his compositions during formulation by selectively adjusting the relative proportions of Components B and C as added to Component A.

DESCRIPTION OF THE PREFERRED EMBODIMENT

The teachings of the Bobear patent provide a silicone rubber product wherein the proportions of basic ingredients, exclusive of additives such as process aids and fillers, are X parts of a vinyl-containing base polymer or blend of such polymers, 0.01X to 0.50X parts and preferably 0.01X parts of a hydrogen-containing polysiloxane, at least $7.0 \times 10^{-5}X$ parts and preferably $2.6 \times 10^{-4}X$ parts of inhibitor such as methyl ethyl ketone peroxide and at least $1.0 \times 10^{-7}X$ parts and preferably $3.0 \times 10^{-6}X$ parts of a platinum metal catalyst. The formulation system of the present invention will provide the same silicone rubber compositions but will also operate effectively at lower inhibitor levels, namely at approximately $4.0 \times 10^{-5}$ parts of hydroperoxy containing inhibitor per part of vinyl base polymer.

Silicone rubber formulators and fabricators quickly recognized the potential and advantages of rubber compositions falling within the scope of Bobear's specification. It soon became standard practice for the basic ingredients to be packaged and marketed in a two-package system, generally utilizing a 1:1 mix ratio. In the following description, $y = \frac{1}{2}X$. Package A contained of Y parts of the vinyl base polymer or blend, and 0.01Y to 0.04Y parts and preferably 0.02Y parts of the hydrogen-containing polysiloxane cross-linking agent which is sometimes referred to simply as methyl-hydride. Package B also contained Y parts of the vinyl polymer; along with $2.0 \times 10^{-4}Y$ to $8.0 \times 10^{-4}Y$ parts and preferably $6.0 \times 10^{-4}Y$ parts of inhibitor such as methyl ethyl ketone peroxide, and $1.0 \times 10^{-6}Y$ to $8.0 \times 10^{-6}Y$ parts and preferably $6.0 \times 10^{-6}Y$ parts of the platinum catalyst.

Combining substantially equal portions of Package A and Package B provided the formulator with the desirable silicone rubber product described by Bobear. However, this sort of formulation had its disadvantages also, as discussed in the background of the invention. First, inventory costs were high since the fabricator had to have on hand large quantities of both Packages A and B in order to produce his product. Secondly, formulators were not used to working with 50:50 ratios of ingredients, preferring instead the industry standard of generally 99:1 mixtures. Furthermore, the two-package system effectively limits the ability of the formulator to control his process parameters by fixing the catalyst to inhibitor ratio. It has now been found that selective adjustment of this ratio will beneficially affect such matters as cure speed, cure temperatures, workable pot life, and shelf stability, etc.

The process of the present invention provides these benefits and overcomes the above-described disadvantages through the utilization of a three-package system which is exemplified but not limited by the following description. In this description, $W = 0.99X$ and $Z = 0.01X$. Package A contains W parts of the vinyl polymers described above and $5.0 \times 10^{-3}W$ to $3.0 \times 10^{-2}W$ parts and preferably $1.4 \times 10^{-2}W$ parts of the hydrogen-containing polysiloxane cross-linking agent. Package A will generally amount to approximately 99% of the total composition by weight but could conceivably be varied from about 95% to 99.9% by weight. The ingredients contained in Packages B and C will constitute the remaining portion of the composition thereby approximately providing the formulator with a desirable 99:1 mix ratio, where Package A is approximately 99 parts by weight and Packages B plus C together comprise approximately one part by weight.

Package B is the cure agent containing Z parts of the vinyl polymers (as a carrier for the catalyst), 0.02Z to 0.05Z parts and preferably 0.03Z parts hydroperoxy-containing inhibitor such as methyl ethyl ketone peroxide, and $1.0 \times 10^{-4}Z$ to $8.0 \times 10^{-4}Z$ parts and preferably $3.5 \times 10^{-4}Z$ parts platinum catalyst.

Package C also contains Z parts of the vinyl-containing polymers, and from 0.01Z to 0.12Z parts and preferably 0.06Z parts of the inhibitor, but no catalyst is contained therein. Package C therefore is a cure modifying agent.

It will be recognized that the relative proportions of the cure agent in Package B and the cure modifying agent in Package C can be adjusted to provide beneficial processing parameters which product rubber compositions falling within the scope of the Bobear disclosure as well as new rubber formulations of the present invention.

As a basic constituent there is present in the present composition the vinyl-containing polysiloxane of formula (1), wherein the polymer contains at least 0.005 percent vinyl and preferably contains from 0.01 to 1 mole percent vinyl. Preferably, the polymer is linear and preferably the vinyl is at the terminal positions of the linear polymer chain. However, broadly, in accordance with the present invention the vinyl radicals can be on any part of the polymer chain. Irrespective of whether there is some polymer chain vinyl in the polymer, it is preferred that there be at least some terminal vinyl groups in the polymer. It is understood that this polymer can be a single polymer species or it can be a blend of vinyl-containing polymer materials which can have varying viscosities of from 1,000 to 300,000,000 centipoise at 25° C., with the final blend having a viscosity varying from 11,000 to 300,000,000 centipoise at 25° C.

Most preferably, the polymer of formula (1) has a viscosity that varies from 1,000,000 to 200,000,000 centipoise at 25° C. The other substituent groups in addition to the vinyl radical can be any monovalent hydrocarbon radicals or halogenated monovalent hydrocarbon radicals, preferably not exceeding 10 carbon atoms. Most preferably, the R substituent group is selected from lower alkyl radicals of 1 to 8 carbon atoms, vinyl radicals and phenyl radicals and also fluoroalkyl radicals of 3 to 10 carbon atoms such as, trifluoropropyl.

The most preferred polymer species within the scope of the vinyl-containing polymer of formula (1) is the vinyl-containing polymer of formula (2), a strictly linear polymer with vinyl radical terminal units. This polymer or blend of such polymers may have a viscosity of from 1,000 to 200,000,000 centipoise at 25° C., but is preferably a polymer that has a viscosity of 1,000,000 to 200,000,000 centipoise at 25° C. It can be understood that when the polymers of formula (2) are utilized within those polymers of the scope of formula (1), that the polymers of formula (2) need not be a single polymer species but may be a blend of vinyl-containing polymers of formula (2) having different viscosities.

In that respect, it should be noted that the R' radicals can be vinyl, although in most instances it is preferred that R' not be a vinyl radical within the scope of formula (2). It is possible to produce compositions where none of the R' radicals are vinyl within the vinyl concentrations specified previously.

It should also be noted that for high viscosity systems it is preferred that the vinyl-containing polymers or blends of such polymers of formulas (1) and (2) have a viscosity of 1,000,000 to 200,000,000 centipoise at 25° C.

Within the scope of formula (2), R' may be selected from vinyl and may be on any portion of the polymer chain. However, only a minimal number of R' radicals may be vinyl radicals in accordance with the disclosure set forth above. Preferably, R' is selected from the class consisting of phenyl, lower alkyl radicals of 1 to 8 carbon atoms and fluoroalkyl radicals of 3 to 10 carbon atoms such as, trifluoropropyl. However, the R' radicals may be selected from any monovalent hydrocarbon radicals and halogenated monovalent hydrocarbon radicals of less than 10 carbon atoms.

In accordance with the disclosure set forth hereinabove, the viscosity of the polymer in formula (2) may vary anywhere from 1,000 to 300,000,000 centipoise at 25° C., and the value of x may vary from 330 to 11,000.

The above-described vinyl-containing polymers are a basic constituent of the silicone rubber compositions of the present invention. In addition cure systems such as herein provided, another basic constituent is the hydrogen-containing polysiloxane cross-linking agent. Any hydride cross-linking agent normally utilized in SiH-olefin platinum catalyzed reactions to form silicone elastomers or silicone polymers may be utilized in the instant care. The preferred hydride cross-linking agents for utilization in silicone elastomers either at room temperature or elevated temperature are disclosed below. For instance, there may be utilized a hydride cross-linking agent composed of,

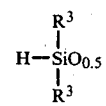

units and $SiO_2$ units where the ratio of $R^3$ to Si moieties varies from 1.1 to 1.9 and $R^3$ is selected from the class consisting generally of any monovalent hydrocarbon radicals or halogenated monovalent hydrocarbon radicals of up to 10 carbon atoms. More preferably, $R^3$ is selected from the class consisting of alkyl radicals of 1 to 8 carbon atoms, phenyl radicals and fluoroalkyl radicals of 3 to 10 carbon atoms. A specific desirable fluoroalkyl radical being trifluoropropyl. Generally, for any hydride cross-linking agent utilized in the instant invention, it is preferred that the hydride cross-linking agent have a hydride content broadly of 0.05 to 5% and more preferably of 0.1 to 1% by weight.

Another hydride cross-linking agent is one containing monofunctional units, tetrafunctional units and also difunctional units. For instance, there may be utilized as a hydride cross-linking agent in the instant invention a hydride silicone resin composed of

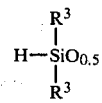

units, $SiO_2$ units and $(R^3)_2SiO$ units where the $R^3$ to Si moiety ratio may vary from 1.5 to 2.1. Again, it is necessary that the hydride content of this silicone resin be within the specification set forth above if the proper cross-link density is to be obtained in the final cured product. Broadly speaking, the $R^3$ radical may be selected from any monovalent hydrocarbon radical or halogenated monovalent hydrocarbon radical of up to 10 carbon atoms, but more preferably the $R^3$ radical is selected from lower alkyl radicals of 1 to 8 carbon atoms, phenyl radicals and fluoroalkyl radicals of 3 to 10 carbon atoms, the most preferred fluoroalkyl radical being trifluoropropyl.

It should also be noted that such hydride cross-linking agents desirably may not have any vinyl units in them or other unsaturated groups since this may result in accelerated curing of the composition. However, this is not a stringent requirement with the present composition as it would be with prior art compositions because of the inhibitor additive in the instant compositions. Accordingly, a certain amount of unsaturation can be tolerated in the hydride cross-linking agents. The only undesirable aspect of having a certain amount of unsaturation in the hydride cross-linking agent is that the proper cross-linked density may not be obtained. Generally, less than 0.001 mole percent of unsaturated radicals can be tolerated in the instant hydride cross-linking agent when the inhibitor compound additive of the instant case is utilized and the optimum physical properties in the cured composition are desired.

Another preferred hydride cross-linking agent is that of the formula,

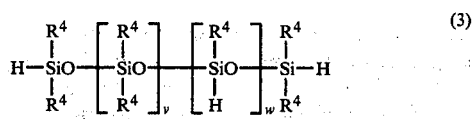

It should be noted that even though the above compound of formula (3) is linear, hydride-containing branch-chained polymers can be utilized as hydride cross-linking agents in the instant invention. However, a polymer that is linear such as that of formula (3), is desirable because it results in a cured elastomer of optimum physical properties. Preferably, in formula (3), $R^4$ generally may be selected from any monovalent hydrocarbon radicals or halogenated monovalent hydrocarbon radicals, preferably, of up to 10 carbon atoms. More preferably, $R^4$ is selected from alkyl radicals of 1 to 8 carbon atoms, phenyl, fluoroalkyl radicals of 3 to 10 carbon atoms and hydrogen, the preferred fluoroalkyl radical being trifluoropropyl. Accordingly, the hydride polysiloxane polymer cross-linking agents generally may have a viscosity of anywhere from 1 to 100,000 centipoise at 25° C., and more preferably have a viscosity of anywhere from 1 to 10,000 centipoise at 25° C. In formula (3), preferably v may vary anywhere from 1 to 1000 and w may vary from 0 to 200. Although the hydrogen atoms in the hydrogen polysiloxane polymer of formula (3) may be solely located in the terminal position of the polymer chain, there can also be some hydrogen atoms in the internal position of the polymer chain. The terminal location of the hydrogen atom is desired for optimum physical properties in the cured composition. In this respect, it is also true that the particular hydride cross-linking agent will be selected depending on the end use for which the composition is intended. However, the hydride resins disclosed and the hydrogen polysiloxane of formula (3) are the preferred hydride cross-linking agents for the production of silicone elastomers. Preferably, the viscosity of the polymer of formula (3) varies, as stated previously, from 1 to 10,000 centipoise at 25° C., and more preferably varies from 1 to 1,000 centipoise at 25° C.

Another necessary ingredient in the instant composition is a platinum catalyst. Generally, there must be utilized at least 0.1 parts per million of a platinum catalyst in terms of parts of platinum metal. This platinum catalyst may be in any form. It may be a solid platinum metal deposited on a solid carrier or it may be a solubilized platinum complex. Any type of platinum catalyst will work in the instant invention. More preferably, the platinum complex is a solubilized platinum complex. Many types of platinum compounds for this SiH-olefin addition reaction are known and such platinum catalysts may be used for the reaction of the present case. The preferred platinum catalysts, especially when optical clarity is required, are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2.C_3H_6)_2$ described in U.S. Pat. No. 3,159,662, Ashby.

Still further, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are hereby incorporated by reference.

The preferred platinum compound is also a flame retardant additive disclosed in Karstedt, U.S. Pat. No. 3,814,730. Generally speaking, this type of platinum complex is formed by reacting chloroplatinic acid containing 4 moles of water of hydration with tetravinylcyclotetrasiloxane in the presence of sodium bicarbonate in an ethanol solution.

In a general aspect, per 100 parts of the vinyl-containing polymers of formulas (1) or (2) and blends of such polymers there is utilized at least 0.1 parts per million of platinum metal and more preferably 1 to 50 parts per million of platinum metal whether as solid platinum deposited on a solid carrier or a solubilized platinum complex. With these ingredients there is utilized generally from 1 to 50 parts of the hydride cross-linking agent within the specification set forth above for hydride content, and more preferably from 1 to 25 parts of the hydride cross-linking agent.

The final basic ingredient in the instant composition is the inhibitor. Accordingly, in the present mixture there must be at least 0.004 parts per 100 parts of the vinyl-containing polymer of an inhibitor compound which can be any organic or silicone compound containing at least one hydroperoxy radical. It has been found that the inhibition level in the curing of the instant composition is accomplished by the presence of the hydroperoxy radical. It has been found that there must be at least 0.004 parts of the inhibitor compound present to effect some inhibitor activity in the present composition. However, the amount of inhibitor compound that is added to the composition will vary in accordance with a particular application of the composition as can be appreciated. The higher the level of the inhibitor that is present, the longer the composition will be shelf stable for a one-component system and the longer the composition will have a work-life if it is a two-component system. For most applications, the concentration of the hydroperoxy inhibitor compound may vary anywhere from 0.01 to 10 parts by weight per 100 parts of the base vinyl-containing compound. However, higher levels of inhibitor compound may be utilized, as desired, to further increase the shelf stability of a one-component or to increase the work-life of a two-component system such that there can be obtained a shelf stability of as much as 6 months or more and a work-life of a number of weeks, if necessary. The above preferred range of concentration is given only for most applications of SiH-olefin platinum catalyzed compositions.

As far as the structure of the hydroperoxy containing compound it can have any desired structure as long as it contains a hydroperoxy radical in the molecular structure because it is such hydroperoxy radical that accomplishes the inhibiting activity for reasons that are not known.

Other hydroperoxy inhibitor compounds that may be utilized in the instant invention are, for instance, methylethylketone peroxides, cumene hydroperoxide, 1,1,3,3-tetramethylbutylhydroperoxide and 2,5-dimethyl-2,5-dihydroperoxy hexane.

Other compounds that may be utilized are methylethylketone peroxide, cumene hydroperoxide, t-butyl hydroperoxide, 1-hydroxycyclohexyl hydroperoxide, 1,1,3,3-tetramethylbutyl hydroperoxide, 2,5-dimethyl-2,5-dihydroperoxy hexane, decalin hydroperoxide, 1,1,2,2-tetramethylpropyl hydroperoxide, p-methane hydroperoxide and pinane hydroperoxide. These compounds are manufactured and sold by Pennwalt Corp., Hercules, Inc., and Lucidol Chemical Co.

The above compounds are only exemplary and many others can be utilized since compounds containing hydroperoxy radicals are well-known.

These are the basic ingredients of the instant composition. As far as the production of the polymers within the scope of formulas (1) and (2), these are well-known compounds. Reference is made to the patent of Jeram and Striker, U.S. Pat. No. 3,884,866, whose disclosure is hereby incorporated by reference. Such polymers are usually made by the equilibrium of vinyl-containing cyclic polysiloxanes or non-vinyl containing chainstoppers at elevated temperature to produce high viscosity vinyl-containing polymers. Such equilibration reactions are carried out with the use of alkali metal catalysts or in the case in the production of low viscosity vinyl-containing polymers by the use of acid catalysts such as, toluene sulfonic acid or acid-activated clay. In the case when the polymer is desired to contain some fluoroalkyl groups then a slightly different procedure is utilized such as, for instance, that disclosed in the issued patent of John Razzano, U.S. Pat. No. 3,937,684. The hydride cross-linking agents are also well-known as disclosed in the above Jeram and Striker U.S. Pat. No. 3,884,866. Simply stated, the hydride resins are simply produced by the hydrolysis of the appropriate hydrochlorosilane in a two-phase hydrolysis system, that is, with a water immiscible solvent and water, and separating the resulting hydrolyzate.

The hydrogen polysiloxane cross-linking agent of formula (3) is also produced by equilibration processes or by hydrolysis processes and more generally by the equilibration of tetrasiloxanes with the appropriate hydride chain-stoppers in the presence of an acid activated equilibration catalyst. For instance, the processes disclosed in U.S. Pat. No. 3,853,933, Siciliano and U.S. Pat. No. 3,853,934, Siciliano and Holdstock, may be utilized. In the case again where the polymer is a fluorosilicone containing polymer the special procedures disclosed in the above Razzano, U.S. Pat. No. 3,937,684, have been utilized.

There may be added other ingredients to the basic composition of the instant case. There may be utilized as a reinforcing agent to give the final composition good physical strength, a vinyl-containing polysiloxane which is utilized at a concentration of from generally 1 to 50 parts to preferably 1 to 25 parts per 100 parts of the basic vinyl-containing polymer of formulas (1) and (2) of a compound of the formula,

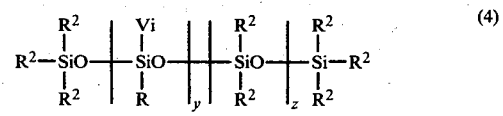

In formula (4), the vinyl units are only in the internal portion of the polymer chain. Again, the vinyl content of this polymer must be such that the vinyl concentration of the total vinyl-containing polymers must be at least 0.005 mole percent and may vary anywhere from 0.01 to 1 mole percent. Although a higher vinyl content may be utilized, it serves no purpose and decreases the strength of the composition. In formula (4), Vi is vinyl and the $R^2$ radical may be selected from any monovalent hydrocarbon radical or halogenated monovalent hydrocarbon radical of up to 10 carbon atoms. More preferably, the $R^2$ radical of formula (4) is selected from alkyl radicals of 1 to 8 carbon atoms, phenyl radicals, fluoroalkyl radicals of 3 to 10 carbon atoms, preferably, trifluoropropyl, and mixtures thereof, where y varies from 1 to 4,000 and z varies from 1 to 4,000 and which polymer has a viscosity that generally varies anywhere from 1,000 to 1,000,000 centipoise at 25° C., and more preferably varies from 50,000 to 500,000 centipoise at 25° C. Such vinyl-containing polymers may be produced in accordance with the processes set forth in the aforesaid Razzano and Jeram/Striker patents. These polymers of formula (4) are basically for the purpose of reinforcing the strength of the basic composition in the absence of a filler. Vinyl-containing silicone resins may also be utilized and specifically vinyl-containing silicone resins having fluoroalkyl substituted groups may be utilized as an additional or alternative additive in the present composition. Preferably, the vinyl-containing polymer of formula (4) has a viscosity that varies anywhere from 50,000 to 500,000 centipoise at 25° C. even for higher viscosity compositions.

The other additive that may be utilized in the instant invention is a filler and accordingly per 100 parts of the basic vinyl-containing polymer there may be utilized anywhere from 5 to 150 parts of a filler selected from the class of well-known reinforcing fillers such as, fumed silica and precipitated silica and extending fillers such as, titanium oxide. For instance, there may be utilized a filler in the broad range set forth above or more preferably in the range of 10 to 75 parts which filler is selected from the class consisting of titanium oxide, lithopone, zinc oxide, zirconium silicate, silica aerogel, iron oxide, diatomaceous earth, calcium carbonate, fumed silica, cyclic polysiloxane treated silica, silazane treated silica, precipitated silica glass fibers, magnesium oxide, chromic oxide, zirconium oxide, alpha quartz, calcined clay, asbestos, carbon, graphite, cork, cotton and synthetic fibers. The reinforcing fillers of fumed silica and precipitated silica are preferred when a high strength in the resulting silicone elastomer is desired, especially fumed and precipitated silica which have been treated with silicone compounds as is well-known in the art. However, in the case when it is desirable not to increase the uncured viscosity of the composition which is sometimes caused by the reinforcing fillers, then the other fillers may be utilized. Also, it is well-known in the art that extending fillers may be used in combinations with reinforcing fillers, treated or untreated, to et the proper balance in final physical properties in the silicone elastomer. Other additives may be utilized in the instant composition as is well-known in SiH-olefin platinum catalyzed composition. Accordingly, the additional additives that may be added to such basic composition of the instant case to produce desired end properties in the cured silicone elastomer are many. For instance, there may be utilized additional flame retardant additives; there may be utilized heat aging additives as well as pigments and process aids such as that disclosed in Konkle, U.S. Pat. No. 2,890,188. It is only necessary that the additive does not interreact with the hydroperoxy radical such that the hydroperoxy inhibitor compound loses its effectiveness.

What has been disclosed and claimed is a basic system for producing a silicone elastomer from three components which exhibits the required shelf stability or work life.

In addition, examples of treating agents for the fillers as well as other additives that may be added to the basic composition of the instant case is disclosed in the above patents and patent applications of Jeram and Jeram/Striker.

It has been found that ordinary peroxides will function only slightly as inhibitors in the instant compositions. What has been found as the outstanding inhibitors in accordance with the present invention are compounds containing hydroperoxy radicals in the concentrations set forth above.

EXAMPLE I

There was prepared a basic composition, Composition A, comprised of 80 parts by weight of a vinyl chain stopped dimethyl polysiloxane of 20,000,000 centipoise viscosity at 25° C. To this there was added 20 parts by weight of an 0.6 mole percent vinyl-containing methyl polysiloxane where the vinyl was in the internal portion of the chain. The polymer was trimethyl chain stopped, and had a viscosity of 55,000,000 centipoise at 25° C. To this there was added 2 parts of a silanol-containing polydimethylsiloxane process aid of 25 centipoise at 25° C. Such process aids can be utilized in the present invention to facilitate the preparation of high viscosity compositions, specifically compositions having a viscosity of 1,000,000 to 300,000,000 centipoise at 25° C. To this mixture there was added 40 parts by weight of fumed silica treated with octamethyl cyclotetrasiloxane in accordance with Lucas, U.S. Pat. No. 2,938,009, which is hereby incorporated by reference. To this mixture there was added 1 part per 100 parts of polysiloxane polymers of a hydrogen-containing polysiloxane of the formula,

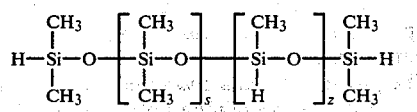

where $s$ and $z$ are such that the viscosity of the above polymer was 50 centipoise at 25° C.

There was prepared another basic composition, Composition B, comprised of the same polymers, process aid, and filler as Composition A but with no methyl hydride cross-linking agent. Instead, to 99 parts by weight of this mixture (B) were added 0.660 parts by weight of Lupersol DDM (60.5% methyl ethyl ketone peroxide) and 0.140 parts by weight of Lamoreaux Platinum as disclosed above and 0.200 parts by weight treated fumed silica.

Composition B, therefore contains per 100 parts B, 0.40 parts of methyl ethyl ketone peroxide and $5.0 \times 10^{-3}$ parts platinum or per 1 part B, $4.0 \times 10^{-3}$ parts methyl ethyl ketone peroxide and $5.0 \times 10^{-5}$ parts of platinum.

To 99.3 parts of Composition A were added 0.70 parts of Composition B on a two roll mill. This 100 parts now contains $2.8 \times 10^{-3}$ parts of methyl ethyl ketone peroxide and $3.5 \times 10^{-5}$ parts of platinum. Since the mixture contains 69.93 parts of siloxane polymers, it now contains 40 parts of methyl ethyl ketone peroxide (MEKP) per million parts of polysiloxane and 0.5 parts platinum per million parts of polysiloxane. It will be recognized that 40 ppm of MEKP is significantly less than the 70 ppm minimum inhibitor level specified by Bobear. This mixture was divided into two parts. The first part was molded and immediately cured in a compression mold into a 6×6 inch test slab. The second part was shelf-aged 16 hours and then molded as above. The physical properties are shown in Table I.

TABLE I

|  | Part I | Part II |
|---|---|---|
| Durometer | 53 | 54 |
| Tensile Strength, psi | 1345 | 1232 |
| Elongation, % | 780 | 720 |
| Tear Strength, ppi | 230 | 245 |

As can be seen by the data the mixture was not affected by the shelf age and had at least 16 hours shelf life.

EXAMPLE II

Composition A was prepared exactly as in Example I. Composition B was comprised of the same polymers, process aid, and filler as Composition A but with no methyl hydride cross-linking agent. Instead, to 95.30 parts of the polymer, process aid, and filler mixture of A was added 3.36 parts of Lupersol DDM, 0.67 parts of the Lamoreaux platinum catalyst and 0.67 parts of treated filler to aid in incorporating the liquid additives.

Composition C was also comprised of the same polymers, process aid, and filler as Composition A, with no methyl hydride cross-linking agent. Instead, to 92.21 parts of the polymer, process aid, and filler mixture of A was added 6.49 parts of Lupersol DDM and 1.30 parts of treated filler. Note, Composition C has no platinum added. Three test sampls were produced in the following manner:

To 99 parts of Composition A was added 1 part of Composition B and from 0 to 2 parts of Composition C. The scorch was measured as a Model 100 Mansanto Rheometer at 350° F. Those skilled in the art will recognize scorch time as a property of silicone rubber compositions which indicates the time necessary to initiate cross-linking in the material at a given temperature.

The critical value is the T, value. This is related to scorch time in that the higher the T, value the longer it takes to initiate crosslinking. Table II shows the values obtained in the experiment. All the samples had a shelf life of greater than 5 days.

TABLE II

| Amount of Composition C (parts per 99 parts A plus 1 part B) | Platinum Level (parts per million parts siloxane polymer) | Methyl Ethyl Ketone Peroxide Level (parts per million parts siloxane polymer) | $T_1$ (secs) | Shore A | Properties | | Tear Strength (ppi) (Die B) |
|---|---|---|---|---|---|---|---|
| | | | | | Tensile Strength (psi) | Elongation (%) | |
| 0 | 3.3 | 290 | 27 | 55 | 1350 | 810 | 246 |
| 1 | 3.3 | 854 | 39 | 55 | 1400 | 820 | 245 |
| 2 | 3.3 | 1418 | 43 | 54 | 1395 | 770 | 250 |

Those skilled in the art will recognize that the addition of Composition C increases the scorch time while the physical properties remain essentially equivalent.

What is claimed as new and desired to be protected by Letters Patent of the United States is:

1. A process for formulating an addition cured silicone rubber composition, comprising the steps of: mixing 95 to 99.5 parts by weight of Component A, with 0.5 to 5.0 parts of Component B and 0.5 to 5.0 parts Component C; and curing said mixture; wherein (i) Component A is a silicone base compound consisting essentially of 100 parts by weight of a vinyl-containing linear polysiloxane of the formula,

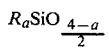

and blends of such polysiloxanes, where R is selected from the class consisting of alkyl radicals of 1 to 8 carbon atoms, vinyl radicals, phenyl radicals, fluoroalkyl radicals of 3 to 10 carbon atoms and mixtures thereof, where the vinyl radical unsaturation in said polymer is at least 0.005 mole percent, and a varies from 1.98 to 2.01, and 0.5 to 50.0 parts by weight of a hydrogen-containing polysiloxane; and (ii) Component B is a cure agent consisting essentially of approximately 100 parts of said vinyl-containing polysiloxane containing therein at least 0.40 parts of an inhibitor compound having at least one radical of the formula —C—O—O—H, and at least 0.001 parts platinum per one hundred parts vinyl polymer in Component B, and (iii) Component C is a cure modifying agent consisting essentially of 100 parts of said vinyl-containing polysiloxane containing at least 0.10 parts of said inhibitor compound.

2. The process of claim 1 wherein the vinyl-containing base polysiloxane has the formula,

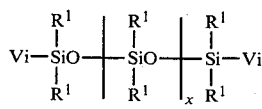

and has a viscosity that varies from 1,000 to 300,000,000 centipoise at 25° C., where Vi is vinyl and $R^1$ is selected from the class consisting of vinyl, phenyl, alkyl radicals of 1 to 8 carbon atoms, fluoroalkyl radicals of 3 to 10 carbon atoms and mixtures thereof and where x varies from 330 to 11,000.

3. The process of claim 1 wherein there is present a blend of vinyl-containing polysiloxanes comprised of a first polysiloxane of the formula of claim 2, with 1 to 50 parts by weight of a second vinyl-containing polysiloxane of the formula, $$\begin{array}{cccc} R^2 & Vi & R^2 & R^2 \\ | & | & | & | \\ R^2-SiO & SiO & SiO & Si-R^2 \\ | & | & | & | \\ R^2 & R^2 & {}_y R^2 & {}_z R^2 \end{array}$$

where Vi is vinyl and $R^2$ is selected from the class consisting of alkyl radicals of 1 to 8 carbon atoms, phenyl, fluoroalkyl radicals of 3 to 10 carbon atoms and mixtures thereof, y varies from 1 to 4,000 and z varies from 1 to 4,000 which have a viscosity that varies from 1,000 to 1,000,000 centipoise at 25° C.

4. The process of claim 3 wherein said first polysiloxane has a viscosity that varies from 1,000,000 to 200,000,000 centipoise at 25° C. and said second polysiloxane has a viscosity that varies from 50,000 to 500,000 centipoise at 25° C.

5. The process of claim 1 wherein the vinyl content of said vinyl-containing polysiloxane and blends of polysiloxane varies from 0.01 to 1.0 mole percent.

6. The process of claim 1 wherein the concentration of said platinum catalyst varies from 1 to 50 parts per million parts vinyl polymer.

7. The process of claim 1 wherein there is present approximately 0.5 to 3.0 parts of the hydrogen-containing polysiloxane.

8. The process of claim 1 wherein the hydride compound is a hydride resin composed of,

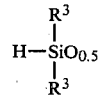

units and $SiO_2$ units where the ratio of $R^3$ to Si varies from 1.1 to 1.9 and $R^3$ is selected from the class consisting of alkyl radicals of 1 to 8 carbon atoms, phenyl radicals and fluoroalkyl radicals of 3 to 10 carbon atoms.

9. The process of claim 1 wherein the hydride compound is a hydride resin composed of,

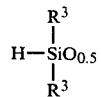

units, $SiO_2$ units and $(R^3)_2SiO$ units where the $R^3$ to Si ratio may vary from 1.5 to 2.1 and $R^3$ is selected from the class consisting of alkyl radicals of 1 to 8 carbon atoms, phenyl radicals and fluoroalkyl radicals of 3 to 10 carbon atoms.

10. The process of claim 1 wherein the hydride compound is a hydride containing polysiloxane of the formula,

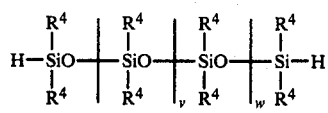

where $R^4$ is selected from the class consisting of alkyl radicals of 1 to 8 carbon atoms, phenyl, fluoroalkyl radicals of 3 to 100 carbons, and hydrogen, $v$ varies from 1 to 1,000 and $w$ varies from 0 to 200 and the viscosity of the polymer varies from 1 to 10,000 centipoise at 25° C.

11. The process of claim 1 wherein there is present per 100 parts of (A) from 5 to 150 parts of a filler selected from the class consisting of titanium oxide, lithopone, zinc oxide, zirconium silicate, silica aerogel, iron oxide, diatomaceous earth, calcium carbonate, fumed silica, cyclicpolysiloxane treated silica, silazane treated silica, precipitated silica, glass fibers, magnesium oxide, chromic oxide, zirconium oxide, alpha quartz, calcined clay, asbestos, carbon, graphite, cork, cotton and synthetic fibers.

12. The process of claim 1 wherein the inhibitor compound is tertiary butyl hydroperoxide.

13. The process of claim 1 wherein the inhibitor compound is methylethylketone peroxide.

14. The process of claim 1 wherein the inhibitor compound is cumene hydroperoxide.

15. The process of claim 1 wherein the inhibitor compound is 1,1,3,3-tetramethylbutyl hydroperoxide.

16. The process of claim 1 wherein the inhibitor compound is 2,5-dimethyl-2,5-dihydroperoxyhexane.

* * * * *